Patented July 5, 1927.

1,634,658

UNITED STATES PATENT OFFICE.

EDWARD F. FLAMMER, OF NEW YORK, AND HALSEY E. SILLIMAN, OF BROOKLYN, NEW YORK, ASSIGNORS, BY MESNE ASSIGNMENTS, TO RAINBOW PHOTO-REPRODUCTIONS, INC., OF NEW YORK, N. Y., A CORPORATION OF NEW YORK.

PHOTOPRINTING.

No Drawing. Application filed October 2, 1924. Serial No. 741,276.

Our invention relates to improvements in photoprinting and more particularly to photoprinting wherein a gelatine or colloid film printing plate is used. The object of the invention is to provide a method of dye printing with such plates which is not only simple and economical, but which also produces reproductions of high quality and novel in character. Nevertheless the invention in its broader aspects is applicable to printing with other mediums. Further and more specific objects, features and advantages will more clearly appear from the detail description below.

To enable those skilled in the art to carry out our invention we will, as an illustration, describe in detail our preferred method of carrying the same into effect with die printing, with the understanding however that many changes and modifications may be made and the invention embodied in widely different forms without departing from the spirit and scope thereof in its broader aspects.

We first take a sheet metal plate of zinc, or preferably Monel metal, and roughen one side thereof with a lithographic grain in a manner well understood by those skilled in the art. With this surface clean and dry we place thereon a thin layer of a binding solution. This solution may be made up of about 3% of gelatine, about 50% water and about 47% silicate of soda. The plate with the thin layer of binder solution is placed in a whirling apparatus with said surface horizontal and uppermost and the plate whirled or rotated in a horizontal plane about an axis passing substantially through the center of the plate, in a manner well understood by those skilled in the art. The whirling removes any excess of the solution and is continued until the treated surface is dry.

We next apply to the plate on top of the dried layer of binder solution a coat or film of sensitized gelatine emulsion. This emulsion may be made up of about 9 pounds of water in which is dissolved 1 pound of gelatine by volume and to this solution there is admixed 1 pound of a 5% solution potassium bichromate in water. The potassium bichromate acts to sensitize the gelatine in a manner well understood by those skilled in the art. The solution with the chromic acid salt sensitizer therein is then applied to the plate so as to form a coating or layer thereof on top of the dried binder solution. The solution is allowed to assume a uniform layer on the plate, and the plate is again whirled as before for 15 minutes but in an oven heated preferably to 140° F. as near as possible. This treatment drys the sensitized gelatine emulsion on the plate and produces a wavy line graining or reticulation in the surface of the dried emulsion. The binding solution causes the sensitized emulsion to adhere firmly to the grained surface of the metal plate.

The plate is then exposed in the manner common in the making of collotype printing plates, or in any other suitable manner, except that instead of exposing the plate behind a negative it is exposed behind a positive and no screen is used.

After this exposure the plate is washed with water to wash out the bichromate which has been unaffected by the light of exposure. This washing may be done by allowing cool tap water to run over the plate for about 5 minutes and then leaving the plate in a tank of cold water for about 15 minutes, while gradually changing the water in the tank by allowing tap water to run in and providing a suitable overflow, in a manner well understood by those skilled in the art.

Then the plate is removed, and, without drying or applying glycerine or equivalent solution as has been common, the plate is placed in a tray of a solution of hydroquinone for about 1½ hours. This solution is preferably made by dissolving 20 grams of dihydroxy-benzene such as hydroquinone in 1000 c. c. of water. This treatment hardens the light exposed parts of the film to a much greater extent than it does the portions which have been unaffected by the light. Tests indicate that while the hydroquinone acts on the portions of the film which have been unaffected by light to increase the hardness thereof (i. e. decrease its water absorbent property) to some extent, it nevertheless acts on the light affected portions of the film to increase the hardness thereof to a much greater extent, so that the hardness of the latter is very materially increased. This action is quite different from that of grain alcohol. Tests indicate that grain alcohol acts selectively only in the sense that when it is applied to a gelatin film with unaltered bichromate therein, it acts to soften the gelatin, i. e. make it capable of absorbing a greater amount of water. When, however, applicants' film, with the unaltered or light unaffected bichromate removed, is treated with hydroquinone or its equivalent, the light affected portions are very materially hardened and the required difference in hardness is not obtained by an increase in softness of water absorbing capacity of the other portions.

After thus treating the plate with the hydroquinone solution it is washed in a tank of changing water for about 10 minutes and then it is placed in a tray of chrome alum solution for about ½ hour to harden or toughen the whole area of the film. The plate is then again washed in the tank of changing water for about 10 minutes when it is ready for printing. The plate has a continuous gelatine film thereon, i. e. the gelatine is not washed away to produce the high lights.

In printing with the plate it may be placed either in a flat bed press or on the cylinder of a rotary cylinder press in any suitable or well known manner. We then apply to the plate a non-greasy dye solution. This dye solution may consist of any suitable dye dissolved or suspended in water. We prefer to use a solution containing about 1 part dye, 100 parts of water and ¼ part of acetic acid by volume. This dye solution is applied to the plate mechanically by the rollers substantially the same as the ink is applied in former processes.

In the well known collotype printing process the sensitized gelatine or colloid plate or film is exposed through a negative, and the light affected portions thereof are relatively hard and selectively take the greasy ink which is applied by the rollers of the press, the portions of the gelatine film which are relatively unaffected by the light being kept wet or in a damp condition whereby they repel the ink so that the plate only takes the ink where it has been, and to the extent it has been affected, by the light. According to our process in its preferred form, however, those portions of the film which have not been materially affected by the light, selectively absorb or take up the dye solution in the proportion and to the extent to which they have been unaffected by the light, while the light affected portions which are relatively hard and non-water absorbent, repel or reject the dye solution, so that upon operation of the press, reproductions of the image or picture photographed on the plate through the positive are reproduced faithfully in positive form. The gelatine plate, since it is exposed through a positive, becomes, in a sense, a negative; but since the dye is retained or taken up relatively by the portions relatively unaffected by the light, the reproductions printed from the plate will be positive in character. If the improved gelatin plate be used to print with a greasy ink, it should be exposed through a negative, and the ink will be taken up by the light affected portions and repelled by the water soaked portions which are relatively unaffected by the light, but by reason of the great difference in hardness, i. e. difference in water absorbing capacity, produced by the hydroquinone or its equivalent, much sharper contrasts are obtained.

Instead of printing directly from the gelatine plate on the final paper or the like, the dye from the gelatine plate may be transferred to a suitable transfer roll and from that printed on the final paper or the like, in a manner which will be clear to those skilled in the art. Also lithographic reproductions in a plurality of colors may be easily produced by providing a separate printing plate for each color and using different colored dyes therewith and printing with these plates consecutively as will be clearly understood by those skilled in the art.

According to our process in its preferred form, reproductions are obtained with extremely beautiful tonal effects and with fine contrasts and deep shadows substantially like photographs in appearance. The "blacks" come out practically solid which is impossible with the ordinary methods using half tone screens, etc. In other methods of collotype printing it has been necessary to frequently stop the press to remoisten the film or otherwise take steps to keep it moist whereby the light unaffected areas will continue to repel the greasy ink used. In our process this is unnecessary. The water in the dye solution keeps the plates in proper condition so that the number of reproductions which may be printed from a single plate without stopping the press is only limited by the mechanical life of the plate.

While we have described our improvements in detail and with respect to a preferred embodiment thereof, we do not desire to be limited to such details or embodiment, since many changes and modifications may be made and the invention embodied in widely different forms without departing from the spirit and scope of the invention in its broader aspects. Hence we desire to cover all forms and modifications coming within the language or scope of any one or more of the appended claims.

What we claim as new and desire to secure by Letters Patent is:

1. The process which consists in exposing a bichromated sensitized colloid film photographically, hardening the light affected portions of the film by treatment with hydroquinone, and printing from the film.

2. The process which consists in exposing a bichromated colloid film through a photographic positive, washing the film to remove the bichromate from the portions unaffected by the light of exposure, producing a greater hardness in the light affected portions than in the light unaffected portions of the film, applying to the film water containing a dye, and printing from the film, the portions of the film unaffected by the light of exposure, selectively receiving the dye and depositing it upon the article printed upon to reproduce the image thereon.

3. The process which consists in exposing a bichromated sensitized colloid film photographically, hardening the light affected portions of the film by treatment with hydroquinone, applying a dye to the film and printing therefrom.

4. The process which consists in exposing a sensitized colloid film photographically, hardening the light affected portions of the film by treatment with hydro-quinone solution, treating the film with a chrome alum solution to harden the whole area thereof, applying a dye to the film and printing therefrom.

5. The process which consists in exposing a sensitized colloid film photographically, hardening the light affected portions of the film by treatment with hydro-quinone solution, treating the film with a chrome alum solution to harden the whole area thereof, applying a dye to the film and printing therefrom, the dye being in the form of a water solution and being selectively retained and given up by those portions of the film unaffected by the light of exposure.

6. The process which consists in providing a colloid film sensitized with a chromic acid salt, exposing the film photographically, washing the film to remove chromic acid salt unaffected by the light, and subjecting the film to a reagent which not only acts on the portions of the film which have been relatively unaffected by light to increase the hardness thereof, but which also acts on the light affected portions of the film to increase the hardness thereof, to a much greater extent.

7. The process which consists in providing a colloid film sensitized with a chromic acid salt, exposing the film photographically, washing the film to remove chromic acid salt unaffected by the light, and subjecting the film to a reagent which acts on the light affected portions of the film to materially increase the hardness thereof, without similarly increasing the hardness of the portions of the film which have been unaffected by the light.

8. The process which consists in providing a colloid film sensitized with a chromic acid salt, exposing the film photographically and subjecting the film to a reagent which not only acts on the portions of the film which have been relatively unaffected by light to increase the hardness thereof, but which also acts on the light affected portions of the film to increase the hardness thereof, to a much greater extent and printing from said film.

9. The process which consists in providing a colloid film sensitized with a chromic acid salt, exposing the film photographically, washing the film to remove chromic acid salt unaffected by the light, and subjecting the film to a reagent which not only acts on the portions of the film which have been relatively unaffected by light to increase the hardness thereof, but which also acts on the light affected portions of the film to increase the hardness thereof to a much greater extent, applying to the surface of the film a non-greasy dye which is repelled by the light affected portions and retained by the other portions of the surface of the film, and printing therefrom, the gelatine surface selectively receiving the dye and depositing it upon the article printed upon to reproduce the photographed image thereon.

10. The process which consists in providing a colloid film sensitized with a chromic acid salt, exposing the film photographically, washing the film to remove chromic acid salt unaffected by the light, and subjecting the film to a reagent which acts on the light affected portions of the film to materially increase the hardness thereof, without similarly increasing the hardness of the portions of the film which have been unaffected by the light and printing from the film without removing the portions of the colloid film which have been unaffected by the light of exposure.

11. The process which consists in providing a colloid film sensitized with a chromic acid salt, exposing the film photographically, washing the film to remove chromic acid salt unaffected by the light, and subjecting the film to a reagent which acts on the light affected portions of the film to materially increase the hardness thereof, without similarly increasing the hardness of the portions of the film which have been unaffected by the light, treating the film to harden the whole area thereof, and printing from said film.

12. The process which consists in providing a colloid film sensitized with a chromic acid salt, exposing the film photographically, washing the film to remove chromic acid salt unaffected by the light, and subjecting the film to a reagent which not only acts on the portions of the film which have been relatively unaffected by light to increase the hardness thereof, but which also acts on the light affected portions of the film to increase the hardness thereof to a much greater extent, applying a non-greasy dye to the film without removing the portions of the colloid film which have been unaffected by the light of exposure, and printing from said film.

13. The process which consists in providing a colloid film sensitized with a chromic acid salt, exposing the film photographically, and without any screen, washing the film to remove chromic acid salt unaffected by the light, and subjecting the film to a reagent which acts on the light affected portions of the film to materially increase the hardness thereof, without similarly increasing the hardness of the portions of the film which have been unaffected by the light; and printing from the film without removing the portions of the colloid film which have been unaffected by the light of exposure.

14. The process which consists in providing a colloid film sensitized with a chromic acid salt, exposing the film photographically and without any screen, washing the film to remove chromic acid salt unaffected by the light, and subjecting the film to a reagent which not only acts on the portions of the film which have been relatively unaffected by light to increase the hardness thereof, but which also acts on the light affected portions of the film to increase the hardness thereof to a much greater extent, applying a non-greasy dye to the film without removing the portions of the colloid film which have been unaffected by the light of exposure, and printing from said film.

15. A print produced by providing a colloid film sensitized with a chromic acid salt, exposing the film photographically, washing the film to remove chromic acid salt unaffected by the light, and subjecting the film to a reagent which not only acts on the portions of the film which have been relatively unaffected by light to increase the hardness thereof, but which also acts on the light affected portions of the film to increase the hardness thereof, to a much greater extent, applying a non-greasy dye to the film without removing the portions of the colloid film which have been unaffected by the light of exposure, and printing from said film.

16. A print produced by providing a colloid film sensitized with a chromic acid salt, exposing the film photographically, washing the film to remove chromic acid salt unaffected by the light, and subjecting the film to a reagent which acts on the light affected portions of the film to materially increase the hardness thereof, without similarly increasing the hardness of the portions of the film which have been unaffected by the light and printing from the film without removing the portions of the colloid film which have been unaffected by the light of exposure.

17. A print produced by providing a colloid film sensitized with a chromic acid salt, exposing the film photographically and without any screen, washing the film to remove chromic acid salt unaffected by the light, and subjecting the film to a reagent which acts on the light affected portions of the film to materially increase the hardness thereof without similarly increasing the hardness of the portions of the film which have been unaffected by the light of exposure, applying a non-greasy dye to the film without removing the portions of the colloid film which have been unaffected by the light of exposure, and printing from said film.

18. A print produced by exposing a bichromated sensitized colloid film photographically, selectively hardening the light affected portions of the film by treatment with hydroquinone, and printing from the film.

In testimony whereof we have signed our names to this specification.

EDWARD F. FLAMMER.
HALSEY E. SILLIMAN.